(12) United States Patent
Bendapudi

(10) Patent No.: US 7,681,175 B2
(45) Date of Patent: Mar. 16, 2010

(54) METHODS AND SYSTEMS FOR DISPLAYING MULTIPLE UNIQUE DYNAMIC MESSAGES ON A USER INTERFACE

(75) Inventor: Jyotsna Bendapudi, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 988 days.

(21) Appl. No.: 11/416,665

(22) Filed: May 2, 2006

(65) Prior Publication Data

US 2007/0261037 A1 Nov. 8, 2007

(51) Int. Cl.
*G06F 9/44* (2006.01)
(52) U.S. Cl. .................. 717/106; 717/108; 717/111; 717/109; 717/110; 717/105; 719/313; 719/315; 719/316
(58) Field of Classification Search .................. 717/106, 717/105, 108, 111, 109, 110; 719/313, 315, 719/316
See application file for complete search history.

(56) References Cited

U.S. PATENT DOCUMENTS

| | | | |
|---|---|---|---|
| 5,821,932 A | 10/1998 | Pittore | |
| 5,956,509 A * | 9/1999 | Kevner | 719/330 |
| 6,347,342 B1 * | 2/2002 | Marcos et al. | 719/315 |
| 6,430,607 B1 * | 8/2002 | Kavner | 709/217 |
| 6,456,304 B1 * | 9/2002 | Angiulo et al. | 715/779 |
| 6,526,529 B1 | 2/2003 | Miksovsky et al. | |
| 6,681,245 B1 | 1/2004 | Sasagawa | |
| 6,718,535 B1 * | 4/2004 | Underwood | 717/101 |
| 6,912,521 B2 * | 6/2005 | Kraft et al. | 707/2 |
| 7,039,671 B2 | 5/2006 | Cullen | |
| 7,053,862 B2 | 5/2006 | Zerphy et al. | |
| 7,395,539 B1 * | 7/2008 | Havemose | 719/310 |
| 7,426,721 B1 * | 9/2008 | Saulpaugh et al. | 717/144 |
| 7,444,644 B1 * | 10/2008 | Slaughter et al. | 719/315 |
| 7,484,218 B2 * | 1/2009 | Marcos et al. | 719/315 |
| 2002/0032803 A1 * | 3/2002 | Marcos et al. | 709/315 |

OTHER PUBLICATIONS

Title: An object-oriented concurrent systems architecture, author: Tomlinson et al, source: ACM, dated: Apr. 1989.*
Title: Interactive type analysis and extended message splitting; optimizing dynamically-typed object-oriented programs, source: ACM, author: Chambers et al, dated: Jun. 1990.*

(Continued)

*Primary Examiner*—Chameli C Das
(74) *Attorney, Agent, or Firm*—Townsend and Townsend and Crew LLP

(57) ABSTRACT

A computer-implemented method of simultaneously providing a plurality of unique and dynamic messages on a user interface page is provided. A first software object may be built having a plurality of rows, and corresponding job request values being stored in a corresponding one of the plurality of rows. The first software object may be parsed and a dynamic message framed for each row of the first software object. A second software object may be build including a row for each of the framed dynamic messages and added to a session context being persistent across a first and second user interface pages. The second user interface page is displayed with a plurality of dynamic messages therein using a static message and a unique URL stored in each of the rows of the second software object.

20 Claims, 5 Drawing Sheets

OTHER PUBLICATIONS

Oracle Corporation, 2004, "Oracle e-businesssuite, XML Publishing/Oracle Applications Framework Technology Update 11.5.10."

Oracle Corporation, "Message Box", http://www.oracle.com/technology/tech/blaf/specs/messageBox.html, printed Oct. 24, 2006 (4pgs).

Oracle Corporation, "Messaging Flows", http://www.oracle.com/technology/tech/blaf/specs/messaging_flow.html, printed Oct. 24, 2006 (7pgs).

Oracle Corporation, "Messaging Templates", http:www.oracle.com/technology/tech/blaf/specs/dialogsMessaging_template.html, printed Oct. 24, 2006 (15pgs).

* cited by examiner

FIG. 1

XYZ COMPANY ENVIRONMENT MANAGEMENT SYSTEM

File  Edit  View  Go  Help

Management | Clone | Backup | Refresh

Application systems | Requests

Logged in as: userJyotsna@xyz1company.com

Express Backup Request Review

Here are the details of the backup job you scheduled. If changes are required, please use the Back Button within the application.

Do not use the Browser Back button

Cancel    Back    SUBMIT — 106

Profile Details

Profile Name: EBIZ BACKUP
Profile Type: Application System Copy-Compress
Defined By: EXPRESS
Request Type: User Defined
Description: Back Up complete application system using copy-compress method. Database will be shut down during the backup process.

Application System — 104
Jyotest2
Jyotest1
Manast2
ag1150

— 102

Home  Logout  Help          Return to Top

Copyright 2006 XYZ CO

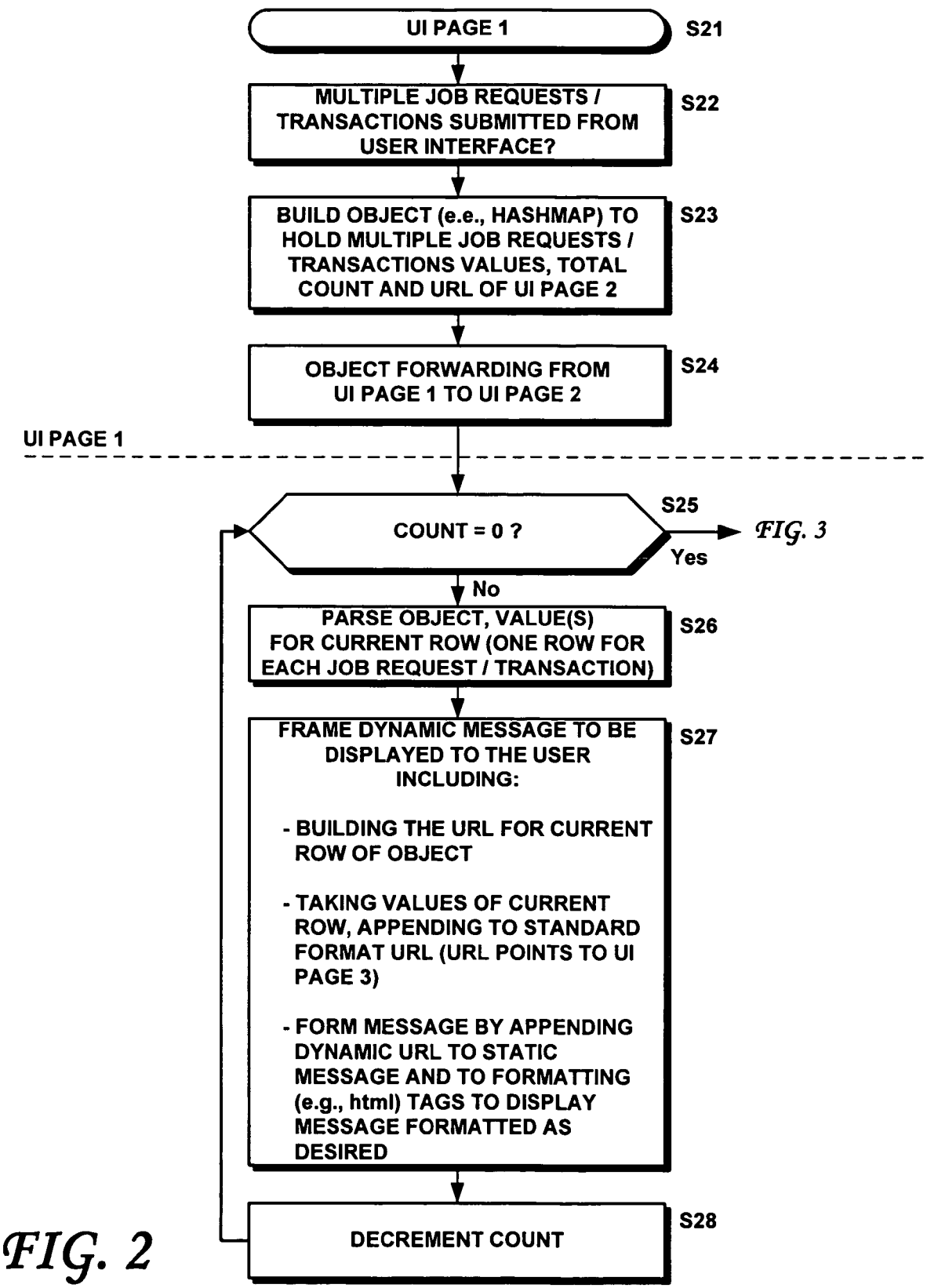

METHODS AND SYSTEMS FOR DISPLAYING MULTIPLE UNIQUE DYNAMIC MESSAGES ON A USER INTERFACE

BACKGROUND OF THE INVENTION

1. Field of the Invention

The present invention relates to the field of computer-implemented messaging methods and systems. More particularly, the present invention relates to computer-implemented methods for displaying multiple dynamic messages on a user interface.

2. Description of the Prior Art and Related Information

When the user is called upon to initiate a function, confirm some action or otherwise interact with an application on a user interface (hereafter, UI), the application conventionally causes a message to be displayed on the UI. The application conventionally causes a message box to be displayed on the UI to display the message. Such a message box may be used to display a variety of user-related messages such as, for example, an error message, a confirmation message, a warning message or an informational message, to name but a few possibilities. Such messages, therefore, are often displayed as a result of the user carrying out some action on the web UI. For example, a user may be transferring $100 from one account to another account at his or her bank. In this example, a confirmation message may be generated in a message box, which message box may be rendered on the current web page or on another web page.

The message box may display a standard and static message such as, for example, "Your requested action has been performed and completed." Such a standard and static message may be utilized for many different user actions, but is not very informative or precise. Alternatively, the message box may display a dynamic message that is customized to the user's action that is the subject of the message. Such a custom and dynamic message may take the form of, for example, "$_____ successfully transferred from account number _____ to account number _____. Your confirmation number for this transfer is _____", where the blanks are dynamically replaced with the pertinent information of the user's just completed transfer.

However, as it may be appreciated, some instances require more than one dynamic message to be displayed in a single message box. Such dynamic messages may be as simple as name/value pairs, optionally with HTML tags to control the appearance of the message. Conventionally, for such dynamic messages to be displayed, a corresponding plurality of message boxes must be generated and rendered, each displaying a single dynamic message. Such multiple message boxes each displaying a single dynamic message, whether displayed on the same or different UI pages, are cumbersome for the user and do not make efficient use of the UI real estate.

However, no mechanism is available that allows a single message box to display multiple different dynamic messages. For example, no available mechanism or method currently allows a single message box to display, in one step, a plurality of dynamic messages of the form, for example:

1. $_____ transferred from bank account number _____ to bank account number _____;
2. $_____ transferred from bank account number _____ to bank account number _____;
3. $_____ transferred from bank account number _____ to bank account number _____, and
4. $_____ transferred from bank account number _____ to bank account number _____.

where each of the blanks is dynamically replaced with its corresponding unique data from the transaction.

From the foregoing, it may be appreciated that improved computer-implemented methods and systems for enabling VIs (such as JAVA web pages, for example) to display a plurality of dynamic and unique messages (say, n dynamic and unique messages) each with different values in a single message box are needed. Such computer-implemented methods and systems would find utility in any instance wherein it is needed to generate ill web pages to display multiple dynamic messages related to user-submitted jobs and/or requests.

SUMMARY OF THE INVENTION

According to an embodiment thereof, the present invention is a computer-implemented method of simultaneously providing a plurality of unique and dynamic messages on a user interface page. Such a computer-implemented method may include steps of, from a first user interface page, accepting a plurality of job requests; building a first software object, the first software object having a plurality of rows, each of the plurality of job requests and corresponding job request values being stored in a corresponding one of the plurality of rows; forwarding the first software object to a second user interface page and, before rendering the second user interface page, parsing the first software object and framing a dynamic message for each row of the first software object, each dynamic message including a unique URL formed of at least one of the job request values appended to a standard format URL and to a static message; building a second software object, the second software object including a row for each of the framed dynamic messages, each row including the static message and the unique URL of the corresponding dynamic message; adding the second software object to a session context, the session context being persistent across the first and second user interface pages; retrieving the second software object from the session context, unpacking the second software object, and rendering the second user interface page and displaying plurality of dynamic messages therein using the static message and the unique URL stored in each of the rows of the second software object.

According to further embodiments, the first software object building step may be carried out with the first software object including a hash map object. The second software object building step may be carried out with the second software object including a vector object. The first and second software objects include may instances of classes of the JAVA programming language. The unique URL of each dynamic message in the parsing step may point to a third user interface page that is configured to display details of one of the plurality of job requests. The unique URL may include a unique job request value appended to the standard format URL and to the static message. The unique job request value may include a unique job identifier or other unique value, for example. The first software object building step may be carried out with the first software object including formatting tags to control the manner in which each of the dynamic messages are to be rendered in the second user interface page. The computer-implemented method may also include displaying the plurality of dynamic messages in a single message box on the second user interface page. The static message may include, for example, plain text.

According to another embodiment thereof, the present invention is a machine-readable medium having data stored thereon representing sequences of instructions which, when executed by a computing device, causes the computing device to simultaneously provide a plurality of unique and dynamic messages on a user interface page. The sequences of instructions may perform the steps of from a first user interface page, accepting a plurality of job requests; building a first software object, the first software object having a plurality of rows, each of the plurality of job requests and corresponding job request values being stored in a corresponding one of the plurality of rows; forwarding the first software object to a second user interface page and, before rendering the second user interface page, parsing the first software object and framing a dynamic message for each row of the first software object, each dynamic message including a unique URL formed of at least one of the job request values appended to a standard format URL and to a static message; building a second software object, the second software object including a row for each of the framed dynamic messages, each row including the static message and the unique URL of the corresponding dynamic message; adding the second software object to a session context, the session context being persistent across the first and second user interface pages; retrieving the second software object from the session context, unpacking the second software object, and rendering the second user interface page and displaying plurality of dynamic messages therein using the static message and the unique URL stored in each of the rows of the second software object.

According to still another embodiment thereof, the present invention is a computer system for simultaneously providing a plurality of unique and dynamic messages on a user interface page. The computer system may include at least one processor; at least one data storage device coupled to the at least one processor; a plurality of processes spawned by said at least one processor, the processes including processing logic for: from a first user interface page, accepting a plurality of job requests; building a first software object, the first software object having a plurality of rows, each of the plurality of job requests and corresponding job request values being stored in a corresponding one of the plurality of rows; forwarding the first software object to a second user interface page and, before rendering the second user interface page, parsing the first software object and framing a dynamic message for each row of the first software object, each dynamic message including a unique URL formed of at least one of the job request values appended to a standard format URL and to a static message; building a second software object, the second software object including a row for each of the framed dynamic messages, each row including the static message and the unique URL of the corresponding dynamic message; adding the second software object to a session context, the session context being persistent across the first and second user interface pages; retrieving the second software object from the session context, unpacking the second software object, and rendering the second user interface page and displaying plurality of dynamic messages therein using the static message and the unique URL stored in each of the rows of the second software object.

BRIEF DESCRIPTION OF THE DRAWINGS

FIG. 1 shows an exemplary user interface for requesting multiple application system backups, according to an embodiment of the present invention.

FIG. 2 shows a first flow chart that illustrates aspects of an embodiment of the present invention.

DETAILED DESCRIPTION

Figure 3:
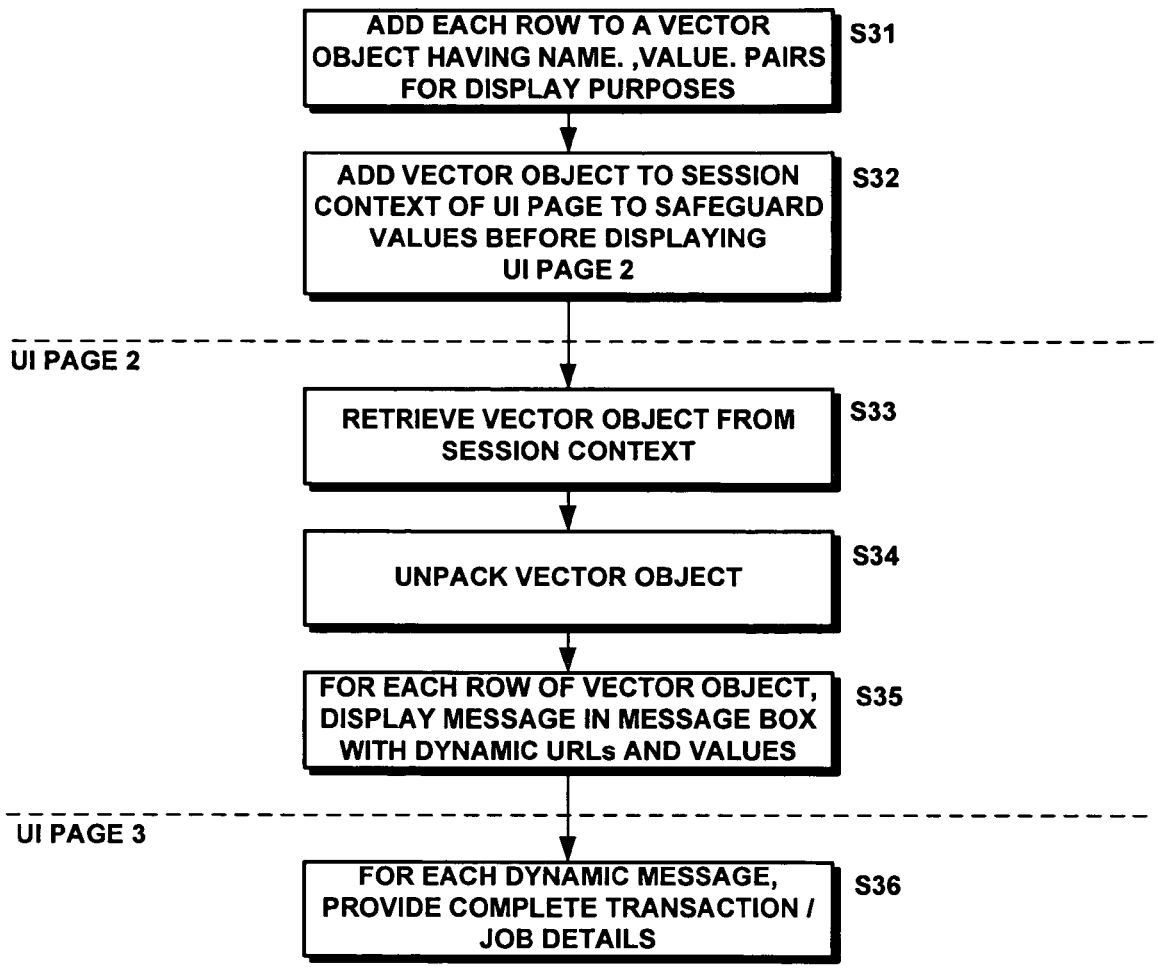
FIG. 3 shows a second flow chart that illustrates further aspects of an embodiment of the present invention.

Embodiments of the present invention are described herein relative to a user interface configured to enable a user to request backup of a plurality of application systems and configured to provide a message box in which a corresponding plurality of unique and dynamic confirmation messages are displayed. However, it should be noted that embodiments of the present invention may be configured for any other purpose in which a plurality of unique and dynamic messages (e.g., information messages, error messages, confirmation messages, warning messages and the like) are to be provided to the user in a single message box or like construct on a user interface page, such as a JAVA-based web page, for example.

FIG. 1 shows an exemplary user interface 102 for requesting multiple application system backups, according to an embodiment of the present invention. The user interface 102 is also referred to in FIG. 2 as UI page 1 at S21. Herein, the phrase "application system" may include within its scope an instance of a database, one or more applications, JAVA files, scripts, data and any required context that may be necessary to fully backup and restore the user's environment upon, for example, a system crash. Embodiments of the present invention enable a user to backup multiple application systems and finds utility when a single user has access to and wishes to back up multiple environments. In that case, there is a need to provide the user with a corresponding plurality of confirmation messages, one for each environment system backup request. Each of the plurality of confirmation messages may include a unique identifier and be configured so as to allow the user to click on or otherwise select the confirmation message or a portion thereof to obtain detailed information relating to the backup request. Such detailed information, according to an embodiment of the present invention, may be on a different user interface page than the user interface page on which the confirmation messages are displayed. As shown in FIG. 1, the first user interface page 102 may identify a plurality of named application systems. As shown the currently logged in user userjyotsna@xyz1company.com has access to four uniquely identified application systems, and has requested that each be backed up. Such application systems, in this illustrative example, are identified by their unique names Jyotest 2, Jyotest1, Manast2 and ag1150, as shown at reference numeral 104. After reviewing the details of the application system backup profile, the user may click on the submit button 106, to submit the backup requests to backup the four named applications shown at 104. This is also shown in FIG. 2 at step S22, in which multiple job requests and/or transactions are submitted for execution from a user interface.

Continuing now with FIG. 2, after the user has clicked the "Submit" button 106 (FIG. 1) or has otherwise submitted a plurality of job requests and/or transactions from the first user interface page, the four job requests may be scheduled at or near the same time and step S22 may be carried out to begin the process of displaying the corresponding plurality of unique (thereby enabling a search to be carried out thereon) and dynamic acknowledgment messages confirming the submission or completion of the submitted requests. Alternatively, other messages relating to the submitted job requests or transactions may be displayed or otherwise provided to the user in response to the submission of the job requests and/or transactions submitted for execution. As shown at S23, embodiments of the present invention call for a first software object, such as a hash map object, to be built to hold the multiple job requests and/or transactions submitted from the first user interface page. The hash map object may include values for each job request, the number of job requests and/or transactions requested, and a hyperlink such as an HTML Uniform Resource Locator (hereafter, URL) of the user interface page where the confirmation messages are to be displayed in a single message box. For example, such a hash map object may include a plurality of rows, one row for each job request and/or transaction to be executed. Each row of the hash map may store, for example, a unique job ID, a unique execution ID for the job request, a job name (each of which may be dynamic variables), a unique and dynamic URL, values and a count equal to the number of job requests and/or transactions submitted. The dynamic URL may include the unique job ID, thereby rendering the dynamic URL unique (thereby enabling the URL to be the subject of searches). The first software object (e.g., hash map) may then be forwarded to the URL of the second user interface page where the confirmation messages are to be displayed, as suggested at step S24.

Before reaching the second user interface page where the message box containing the plurality of messages are to be rendered, a number of steps may be carried out. For example, as shown at S25-S28, a number of steps may be carried out for each of the job requests; that is, for each of the rows of the first software object (e.g., the hash map object) generated in step S23. As shown in FIG. 2, step S25 calls for a determination of whether the count is equal to zero. If not, step S26 may be carried out, in which the first object is parsed and the values for the current job request (i.e., row) may be extracted. Using the values extracted from the current row, the dynamic message corresponding to the current row may be framed as shown at S27. According to an embodiment of the present invention, framing the dynamic message may include steps of building the dynamic URL for the current row of the first object and appending (or pre-pending) selected extracted values stored in the current row of the hash map to a standard format unique URL. This unique URL may point to a third user interface page, where details of the job request and/or transaction referenced in the current row may be displayed. The dynamic message for the current row of the first object may then be formed by concatenating a static message portion (e.g., plain text) to the unique URL. In addition, formatting tags (e.g., HTML tags) may be added to the message to control the manner in which the dynamic message is rendered (e.g., the style with which the message is to be rendered including, for example, a selected font, size, color, position) in the message box of the second user interface page. For example, the dynamic message may include a static message portion such as:

Backup Request _____ has been submitted successfully

This static portion of the dynamic message may be concatenated with the dynamic portion thereof; namely, the unique URL of the user interface page where the details of the job request (in this case, a backup request) may be found. Therefore, the dynamic message may have the general format of <html tags>+<static message>+unique URL. For example, a dynamic message that is to be rendered in the message box rendered in the second user interface page may be as follows:

Backup Request EMS-BACKUP-APPSYS7724 has been submitted successfully

In this example (also shown in FIG. 4 at reference numeral 406), the static portion of the dynamic message is "Backup Request _____ has been submitted successfully," the dynamic URL is EMS-BACKUP-APPSYS7724 which, if clicked or otherwise selected, will cause the display of a third user interface page where the details of this backup request are displayed or otherwise provided to the user. In this example, the HTML tags may indicate Arial Font, 12 pt. and bold—or some identified style that defines this combination of formatting attributes.

Figure 4:
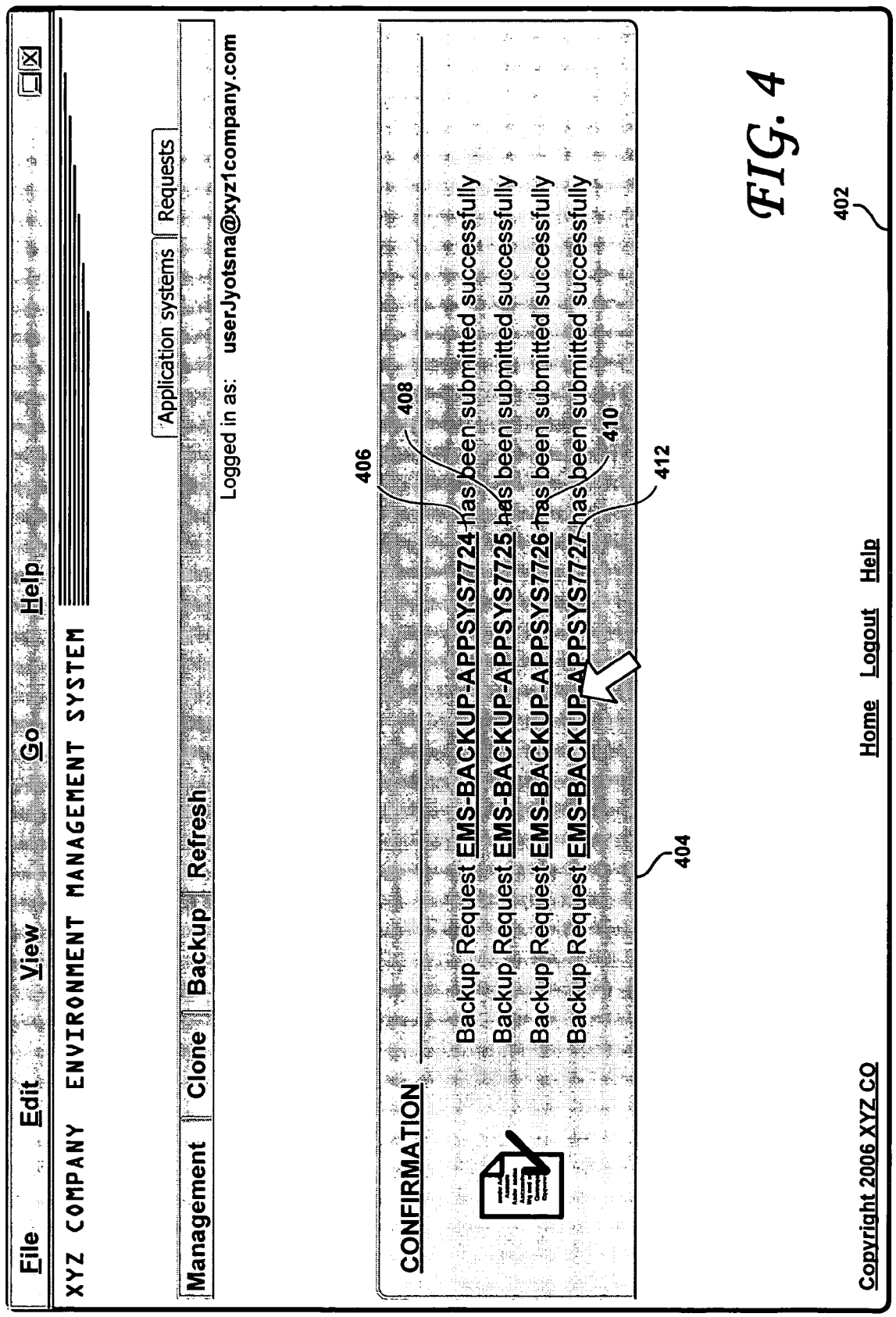
FIG. 4 shows an exemplary user interface showing a message box in which a plurality of unique and dynamic messages are displayed, according to an embodiment of the present invention.

As shown at S28, the count (equal to the number of rows in the first—e.g., hash map—object) may be decremented and the method may revert back to S25 to determine whether the count has been decremented to zero. If not, steps S26 and S27 may be carried out for the next row in the first object to generate additional dynamic messages as described above. When step S25 determines that the count has been decremented to zero, indicating that the last row of the first object has been parsed, step S31 of FIG. 3 may be carried out. As called for by step S31, each dynamic message may be added to a second object such as, for example, a vector object. The second (vector) object may include a plurality of rows that may be accessed using an integer index, in the same manner as an array. The size of the vector object may grow or shrink as needed to accommodate adding and removing items after the vector object has been created. Each row of the vector object, according to an embodiment of the present invention, may include a <name>, <value> pair for display purposes. The <name> portion may include the static portion of the dynamic message, whereas the <value> portion may include the dynamic URL portion thereof. As shown at S32, the second (e.g., vector) object may be added to the current session context (the session context being persistent across user interface pages) to save the values of the second object before displaying the second user interface page. As shown in step S33, the second object (e.g., the vector object) may then be retrieved from the session context. The retrieved second object may then be unpacked as shown at S34. Thereafter, as suggested by step S35, for each row of the second object, the <name>, <value> pair including the static portion of the dynamic message and the dynamic URL portion thereof may be displayed in second user interface page 402 (such as a JAVA web page, for example) within a message box 404, as shown in FIG. 4, and formatted according to the formatting tags contained therein. As shown in the message box 404, a plurality of unique messages (in this illustrative example, backup request confirmation messages) may be displayed in the same message box 404. This is possible as the second object containing the <name>, <value> pairs was retrieved from the session context and contains all of the information needed to display each of the messages within the message box 404. Each of the messages may include a static portion as detailed above. The formatting (e.g., HTML) tags also unpacked from the second (vector) object control the appearance of the dynamic messages within the message box. In addition, each of the confirmation messages may include a dynamic URL such as EMS-BACKUP-APPSYS7724 as shown at 406, EMS-BACKUP-APPSYS7725 as shown at 408, EMS-BACKUP-APPSYS7726 as shown at 410 and EMS-BACKUP-APPSYS7727 as shown at 412. Each of these dynamic URLs may be clicked on (as shown by the cursor over the EMS-BACKUP-APPSYS7727 URL), whereupon a new user interface page may be generated and displayed for the user. This new user interface page may show details of the job request or transaction. In the example developed herein, such a user interface page would provide the user with details of the backup request for the application system 7727.

Figure 5:
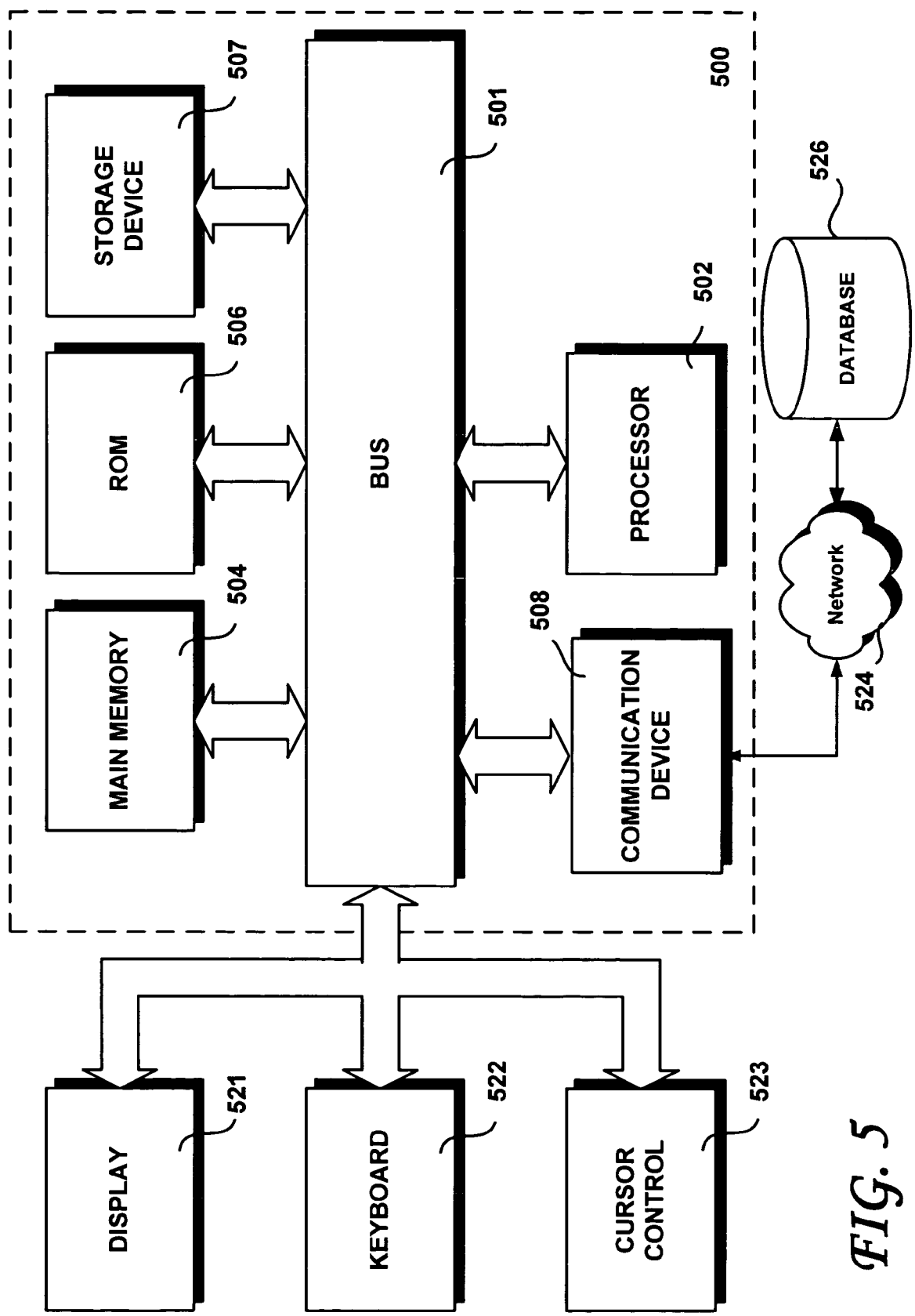
FIG. 5 illustrates a block diagram of a computer system with which embodiments of the present inventions may be implemented.

FIG. 5 illustrates a block diagram of a computer system 500 upon which embodiments of the present inventions may be implemented. Computer system 500 includes a bus 501 or other communication mechanism for communicating information, and one or more processors 502 coupled with bus 501 for processing information. Computer system 500 further comprises a random access memory (RAM) or other dynamic storage device 504 (referred to as main memory), coupled to bus 501 for storing information and instructions to be executed by processor(s) 502. Main memory 504 also may be used for storing temporary variables or other intermediate information during execution of instructions by processor 502. Computer system 500 also includes a read only memory (ROM) and/or other static storage device 506 coupled to bus 501 for storing static information and instructions for processor 502. A data storage device 507, such as a magnetic disk or optical disk, may be coupled to bus 501 for storing information and instructions. The computer system 500 may also be coupled via the bus 501 to a display device 521 for displaying information to a computer user. An alphanumeric input device 522, including alphanumeric and other keys, may be coupled to bus 501 for communicating information and command selections to processor(s) 502. Another type of user input device is cursor control 523, such as a mouse, a trackball, or cursor direction keys for communicating direction information and command selections to processor 502 and for controlling cursor movement on display 521. The computer system 500 may be coupled, via a network 524, to a database 526 configured to store the present reconciliation and write-off data and other information.

Embodiments of the present invention are related to the use of computer system and/or to a plurality of such computer systems to display multiple unique dynamic messages on a user interface. According to one embodiment, the methods and systems described herein may be provided by one or more computer systems 500 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of simultaneously providing a plurality of unique and dynamic messages on a user interface page, the method comprising:

accepting a plurality of job requests from a first user interface page;

building a first software object, the first software object having a plurality of rows, each of the plurality of job requests and corresponding job request values being stored in a corresponding one of the plurality of rows;

forwarding the first software object to a second user interface page;

parsing, before rendering the second user interface page, the first software object and framing a dynamic message for each row of the first software object, each dynamic message including a unique uniform resource locator (URL) formed of at least one of the job request values appended to a standard format URL and to a static message;

building, before rendering the second user interface page, a second software object, the second software object including a row for each of the framed dynamic messages, each row including the static message and the unique URL of the corresponding dynamic message;

adding, before rendering the second user interface page, the second software object to a session context, the session context being persistent across the first and second user interface pages;

retrieving the second software object from the session context;

unpacking the second software object; and rendering the second user interface page and displaying a plurality of dynamic messages therein using the static message and the unique URL stored in each of the rows of the second software object.

2. The computer-implemented method of claim 1, wherein building the first software object comprises building the first software object including a hash map object.

3. The computer-implemented method of claim 1, wherein building the second software object comprises building the second software object including a vector object.

4. The computer-implemented method of claim 1, wherein the first and second software objects include instances of classes of an object oriented programming language.

5. The computer-implemented method of claim 1, wherein the unique URL of each dynamic message in the parsing step points to a third user interface page that is configured to display details of one of the plurality of job requests.

6. The computer-implemented method of claim 1, wherein the unique URL includes a unique job request value appended to the standard format URL and to the static message.

7. The computer-implemented method of claim 6, wherein the unique job request value includes a unique job identifier.

8. The computer-implemented method of claim 1, wherein building the first software object comprises building the first software object including formatting tags to control a manner in which each of the dynamic messages are to be rendered in the second user interface page.

9. The computer-implemented method of claim 1, further including displaying the plurality of dynamic messages in a single message box on the second user interface page.

10. The computer-implemented method of claim 1, wherein the static message includes plain text.

11. A machine-readable storage medium having data stored thereon representing sequences of instructions which executed by a computing device causes the computing device to simultaneously provide a plurality of unique and dynamic messages on a user interface page, the machine-readable storage medium comprising:
- instructions for accepting a plurality of job requests from a first user interface page;
- instructions for building a first software object, the first software object having a plurality of rows, each of the plurality of job requests and corresponding job request values being stored in a corresponding one of the plurality of rows;
- instructions for forwarding the first software object to a second user interface page;
- instructions for parsing, before rendering the second user interface page, the first software object and framing a dynamic message for each row of the first software object, each dynamic message including a unique uniform resource locator (URL) formed of at least one of the job request values appended to a standard format URL and to a static message;
- instructions for building, before rendering the second user interface page, a second software object, the second software object including a row for each of the framed dynamic messages, each row including the static message and the unique URL of the corresponding dynamic message;
- instructions for adding, before rendering the second user interface page, the second software object to a session context, the session context being persistent across the first and second user interface pages;
- instructions for retrieving the second software object from the session context;
- instructions for unpacking the second software object; and
- instructions for rendering the second user interface page and displaying a plurality of dynamic messages therein using the static message and the unique URL stored in each of the rows of the second software object.

12. The machine-readable storage medium of claim 11, wherein the instructions for building the first software object comprise instructions for building the first software object including a hash map object.

13. The machine-readable storage medium of claim 11, wherein the instructions for building the second software object comprise instructions for building the second software object including a vector object.

14. The machine-readable storage medium of claim 11, wherein the first and second software objects include instances of classes of an object oriented programming language.

15. The machine-readable storage medium of claim 11, wherein the unique URL of each dynamic message in the parsing step points to a third user interface page that is configured to display details of one of the plurality of job requests.

16. The machine-readable storage medium of claim 11, wherein the unique URL includes a unique job request value appended to the standard format URL and to the static message.

17. The machine-readable storage medium of claim 11, wherein the instructions for building the first software object comprise instructions for building the first software object including formatting tags to control a manner in which each of the dynamic messages are to be rendered in the second user interface page.

18. The machine-readable storage medium of claim 11, further comprising instructions for displaying the plurality of dynamic messages in a single message box on the second user interface page.

19. The machine-readable storage medium of claim 11, wherein the static message includes plain text.

20. A computer system for simultaneously providing a plurality of unique and dynamic messages on a user interface page, the computer system comprising:
- at least one processor;
- at least one data storage device coupled to the at least one processor; and
- a plurality of processes spawned by said at least one processor, the processes including processing logic for:
  - accepting a plurality of job requests from a first user interface page;
  - building a first software object, the first software object having a plurality of rows, each of the plurality of job requests and corresponding job request values being stored in a corresponding one of the plurality of rows;
  - forwarding the first software object to a second user interface page;
  - parsing, before rendering the second user interface page, the first software object and framing a dynamic message for each row of the first software object, each dynamic message including a unique uniform resource locator (URL) formed of at least one of the job request values appended to a standard format URL and to a static message;
  - building, before rendering the second user interface page, a second software object, the second software object including a row for each of the framed dynamic messages, each row including the static message and the unique URL of the corresponding dynamic message;
  - adding, before rendering the second user interface page, the second software object to a session context, the session context being persistent across the first and second user interface pages;
  - retrieving the second software object from the session context;
  - unpacking the second software object; and
  - rendering the second user interface page and displaying a plurality of dynamic messages therein using the static message and the unique URL stored in each of the rows of the second software object.

* * * * *

UNITED STATES PATENT AND TRADEMARK OFFICE
CERTIFICATE OF CORRECTION

PATENT NO.        : 7,681,175 B2
APPLICATION NO.   : 11/416665
DATED             : March 16, 2010
INVENTOR(S)       : Jyotsna Bendapudi It is certified that error appears in the above-identified patent and that said Letters Patent is hereby corrected as shown below:

On the face page, in field (57), in column 2, Abstract, line 4, delete "rows," and insert -- rows --, therefor.

On page 2, in column 2, under "Other Publications", lines 1-2, delete "Publishing" and insert -- Publisher --, therefor.

In column 10, line 28, in Claim 20, delete "ofjob" and insert -- of job --, therefor.

Signed and Sealed this

Fifth Day of October, 2010

David J. Kappos
*Director of the United States Patent and Trademark Office*